United States Patent Office 2,873,272
Patented Feb. 10, 1959

2,873,272

11-OXYGENATED-17α,20α-EPOXY-4-PREGNENES

Gunther S. Fonken and John A. Hogg, Kalamazoo Township, Kalamazoo County, Mich., assignors to The Upjohn Company, Kalamazoo, Mich., a corporation of Michigan No Drawing. Application July 13, 1955
Serial No. 521,912

5 Claims. (Cl. 260—239.55)

This invention relates to novel steroids, and especially to 11-oxygenated-17α,20α-epoxy-21-hydroxy-4-pregnene-3,20-diones and esters thereof. These steriods may be represented by the following formula:

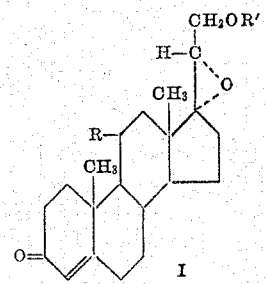

I wherein R' is hydrogen or the acyl radical of a hydrocarbon carboxylic acid containing from one to twelve carbon atoms, preferably acetyl, and R is hydroxy having either the alpha or beta configuration, or keto.

It is an object of the present invention to provide 11α,21- and 11β,21-dihydroxy-17α,20α-epoxy-4-pregnen-3-one and 17α,20α-epoxy-21-hydroxy-4-pregnene-3,11-dione. Another object is the provision of 21-hydrocarbon carboxylic esters thereof. A further object is the provision of a process for the production thereof. Still another object is the provision of a process for the conversion of these compounds into known and physiologically active steriods and the provision of the novel steriod intermediates involved. Other objects will be apparent to those skilled in the art to which this invention pertains.

The novel compounds of the present invention (I) can be prepared by the reaction of an 11α,21-dihydroxy-4,17(20)-[cis]-pregnadien-3-one, 11β,21-dihydroxy-4,17(20)-[cis]-pregnadien-3-one or 21-hydroxy-4,17(20)-[cis]-pregnadiene-3,11-dione, or 21-acyloxy esters thereof represented by the following formula:

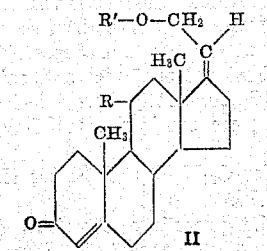

II wherein R is α-hydroxy, β-hydroxy or keto and R' is hydrogen or the acyl radical of a hydrocarbon carboxylic acid containing from one to twelve carbon atoms, with about a molar equivalent of a peracid, e. g., perbenzoic, as shown in the examples hereinafter. Saponification of the 21-acyl group of a 17α,20α-epoxy steriod is productive of the corresponding 21-hydroxy steroids of the present invention. The 17α,20α-epoxy-21-acyloxy-4-pregnene-3,11-diones can also be prepared by the chromic acid oxidation of the corresponding 11-hydroxy-17α,20α-epoxy-21-acyloxy-4-pregnen-3-one.

The starting 11-oxygenated-21-hydroxy-4,17(20)-[cis]-pregnadien-3-ones and 21-esters thereof (II) can be prepared as follows: reacting 11α-hydroxy-progesterone, 11β-hydroxyprogesterone or 11-ketoprogesterone with about one molar equivalent of sodium methoxide and several molar equivalents of diethyl oxalate in benzene is productive of the corresponding 21-alkoxyoxalyl steroids (U. S. 2,683,724). Adding two molar equivalents of bromine at room temperature or below to these steroids in the presence of potassium acetate followed by the addition of at least two molar equivalents of sodium methoxide in the presence of methanol is productive of methyl 3-keto-11α-hydroxy-4,17(20)-[cis]-pregnadien-21-oate, methyl 3-keto-11β-hydroxy-4,17(20)-[cis]-pregnadien-21-oate and methyl 3,11-diketo-4,17(20)-[cis]-pregnadien-21-oate, respectively. Ketalization of the 3-keto group of these compounds with ethylene glycol, followed by a lithium aluminum hydride reduction of the 21-ester group and then hydrolysis of the 3-ketal group is productive of 11α,21-dihydroxy-4,17(20)-[cis]-pregnadien-3-one, 11β,21-dihydroxy-4,17(20)-[cis]-pregnadien-3-one and a mixture of 11α,21- and 11β,21-dihydroxy-4,17(20)-[cis]-pregnadien-3-one, respectively. Esterification of the 21-hydroxy group of these compounds with an acylating derivative, e. g., acid chloride, acid bromide or acid anhydride of a hydrocarbon carboxylic acid containing from one to twelve carbon atoms, inclusive, is productive of the 11-hydroxy-21-acyloxy-4,17(20)-[cis]-pregnadien-3-ones. Oxidation of these compounds with chromic acid in acetic acid is productive of the 21-acyloxy-4,17(20)-[cis]-pregnadiene-3,11-diones, all as more fully disclosed in the copending applications and patents of Hogg et al., Ser. Nos. 307,385, filed August 30, 1952, 345,675 and 345,677, filed March 30, 1953, now Pat. Nos. 2,774,776, 2,735,856, and 2,715,621, respectively, and in U. S. 2,695,906, issued November 30, 1954, and 2,707,184, issued April 26, 1955.

The 11-oxygenated-17α,20α-epoxy-21-acyloxy-4-pregnen-3-ones (I) are useful in the production of a variety of known and physiologically active steroids. For example, opening the oxide of the 11-keto compound of the present invention with a Lewis acid produces the corresponding 17α,20β-glycol, as disclosed hereinafter, i. e., a 21-monoester of Reichstein's Substance U. This compound is oxidized with a large excess of activated manganese dioxide or a chemical equivalent of chromic acid in pyridine to produce 21-esters of cortisone, which in turn are hydrolyzable to cortisone.

Converting an 11-keto compound of the present invention (I, R' is keto) to the corresponding 17α,20β-glycol and then ketalizing the 3-keto group with ethylene glycol or other lower-alkane-α-diol or lower-alkane-β-diol, in the presence of para-toluenesulfonic acid or other acid catalyst, is productive of a 3-ketalized 17α,20β-dihydroxy-21-acyloxy-5-pregnene-3,11-dione. Reducing the 11-keto group to an 11β-hydroxy group with sodium borohydride is productive of a 3-ketalized 11β,17α,20β-trihydroxy-21-acyloxy-5-pregnen-3-one. Hydrolysis of the ketal group with dilute hydrochloric or sulfuric acid in acetone or other inert solvent is productive of 11β,17α,20β-trihydroxy-4-pregnen-3-one (Reichstein's Substance E). Alternatively, the sodium borohydride can be replaced with lithium aluminum hydride to produce the corresponding 3-ketalized 11β,17α,20β,21-tetrahydroxy-5-pregnen-3-one which also is hydrolyzed with the dilute hydrochloric or sulfuric acid in acetone to Reichstein's Substance E. Oxidation of the 20-β-hydroxy group with activated manganese dioxide [Attenburrow et al., J. Chem. Soc. 1094 (1952)], is productive of Kendall's Compound F (hydrocortisone). Alternatively, the 21-hydroxy group of Reichstein's Substance E can be selectively esterified according to methods known in the art to produce Reichstein's Substance E, 21-monoacetate which can then be oxidized with a chemical equivalent of chromic acid in pyridine to cortisone acetate.

Dehydration of 11β-hydroxy-17α,20α-epoxy-21-acetoxy-4-pregnen-3-one or 11α-hydroxy-17α,20α-epoxy-21-acetoxy-4-pregnen-3-one with p-toluenesulfonic acid in refluxing benzene or a mixture of N-bromoacetamide, pyridine and sulfur dioxide, is productive of 17α,20α-epoxy-21-acetoxy-4,9(11)-pregnadien - 3 - one. Opening the oxide with boron trifluoride in dioxane followed by hydrolysis with water is productive of 17α,20β-dihydroxy-21-acetoxy-4,9(11)-pregnadien - 3 - one. Reacting this compound with N-bromoacetamide in the presence of perchloric acid is productive of 9α-bromo-11β,17α,20β-trihydroxy-21-acetoxy-4-pregnen-3-one which is converted, with potassium acetate in refluxing methanol, to 9β,11β-epoxy-17α,20β-dihydroxy - 21 - acetoxy-4-pregnen-3-one. Addition of hydrogen fluoride in chloroform at about zero degrees centigrade to the thus-produced oxide is productive of 9α-fluoro-11β,17α,20-trihydroxy-21-acetoxy-4-pregnen-3-one. This compound possesses mineralocorticoid and glucocorticoid activity. Oxidation of the 20β-hydroxy group with activated manganese dioxide in an inert solvent, e. g., ethyl acetate, is productive of the highly active 9α-fluoro-11β,17α-dihydroxy-21-acetoxy-4-pregnene-3,20-dione (9α-fluorohydrocortisone acetate).

The following examples are illustrative of the compounds of the present invention and a process for their production, but are not to be construed as limiting.

Example 1

*11β-hydroxy-17α,20α-epoxy - 21 - acetoxy-4-prognen-3-one*

A solution of 500 milligrams of 11β-hydroxy-21-acetoxy-4,17(20)-[cis]-pregnadien-3-one in five milliliters of benzene was mixed with a solution of 210 milligrams of perbenzolic acid in 10.5 milliliters of benzene for thirty minutes at room temperature. The precipitated white crystalline product melted at 193 to 196 degrees centigrade. Recrystallization from acetone gave 11β-hydroxy-17α,20α-epoxy-21-acetoxy-4-pregnen-3-one melting at 205 to 209 degrees centigrade, having $[\alpha]_D$ of plus 117 degrees in chloroform and the analysis below.

Calculated for $C_{23}H_{32}O_5$: C, 71.10; H, 8.30. Found: C, 71.09; H, 8.16.

The same product was obtained in better yield by performing the same reaction at between zero and five degrees centigrade for 24 hours. The solution was diluted with fifty milliliters of benzene, washed with water and aqueous five percent sodium bicarbonate, dried and evaporated to dryness. The residue was crystallized from about ten milliliters of acetone to give 310 milligrams of 11β-hydroxy-17α,20α-epoxy-21-acetoxy-4-pregnen-3-one melting at 212 to 216 degrees centigrade.

Similarly, other 11β-hydroxy-21-acyloxy-4,17(20)-[cis]-pregnadien-3-ones are converted to other 11β-hydroxy-17α,20α-epoxy-21-acyloxy-4-pregnen - 3 - ones, by epoxidation of the 17(20)-[cis] double bond, wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, cyclopropylideneacetic, cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3, or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, etc.

The same 21-esters of 11α,21-dihydroxy-17α,20α-epoxy-21-acyloxy-4-pregnene-3-one are similarly prepared from the corresponding 21-esters of 11α,21-dihydroxy-4,17(20)-[cis]-pregnadien-3-one.

Example 2

*17α,20α-epoxy-21-acetoxy-4-pregnene-3,11-dione*

To a solution of one gram of 21-acetoxy-4,17(20)-[cis]-pregnadiene-3,11-dione, prepared by the chromic acid oxidation of 11β-hydroxy-21-acetoxy-4,17(20)-[cis]-pregnadien-3-one in the manner described in the copending application of Hogg et al., Ser. No. 345,675, in ten milliliters of chloroform was added, at about ten degrees centigrade, a solution of one milliliter of thirty percent peracetic acid. The solution was maintained at about ten degrees centigrade for about eighteen hours, diluted with fifty milliliters of chloroform, washed with water, aqueous four percent sodium bicarbonate, and water, dried and then evaporated to dryness. The crystalline residue melted at 143 to 153 degrees centigrade, and when recrystallized from a mixture of acetone and Skellysolve B (hexane hydrocarbons), gave 17α,20α-epoxy-21-acetoxy-4-pregnene-3,11-dione melting at 187 to 189 degrees centigrade, having an $[\alpha]_D$ of plus 140 degrees in acetone and the analysis below.

Calculated for $C_{23}H_{30}O_5$: C, 71.47; H, 7.82. Found: C, 71.40; H, 7.94.

17α,20α-epoxy-21-acetoxy-4-pregnene-3,11-dione was also prepared by the reaction of 388.5 milligrams of 11β-hydroxy-17α,20α-epoxy-21-acetoxy - 4 - pregnen-3-one in fifty milliliters of glacial acetic acid with eighty milligrams of chromic anhydride in 0.5 milliliter of water at about eighteen degrees centigrade for ten minutes.

Similarly, other 17α,20α-epoxy-21-acyloxy-4-pregnene-3,11-diones are prepared, e. g., those wherein the acyl radical is that of an acid named in the paragraph following Example 1, by epoxidation of the 17(20)-double bond of the corresponding 21-acyloxy-4,17(20)-[cis]-pregnadiene-3,11-dione.

Example 3

*11β,21-dihydroxy-17α,20α-epoxy-4-pregnen-3-one*

To a solution of 100 milligrams of 11β-hydroxy-17α,20α-epoxy-21-acetoxy-4-pregnen-3-one in two milliliters of chloroform was added two milliliters of aqueous five percent sodium hydroxide and eight milliliters of methanol. The solution was maintained a room temperature for about eighteen hours and then diluted with twenty milliliters of water and forty milliliters of methylene chloride. The aqueous phase was separated, washed with two twenty-milliliter portions of methylene chloride which were added to the organic phase and the total organic phase washed twice with water and then dried. The solution was distilled to dryness and the residue, which melted at 191 to 202 degrees centigrade, was recrystallized from acetone to give 48 milligrams of 11β,21-dihydroxy-17α,20α-epoxy-4-pregnen-3-one melting at 214 to 220 degrees centigrade and having the analysis below.

Calculated for $C_{21}H_{30}O_4$: C, 72.80; H, 8.73. Found: C, 72.71; H, 8.76.

Following the procedure described above, 17α,20α-epoxy-21-acetoxy-4-pregnene-3, 11-dione is hydrolyzed to 17α,20α-epoxy-21-hydroxy-4-pregnene-3,11-dione.

*17α-hydroxy-20β,21-diacetoxy-4-pregnene-3,11-dione*

A solution of 350 milligrams of 17α,20α-epoxy-21-acetoxy-4-pregnene-3,11-dione in fifteen milliliters of purified dioxane containing eight drops of boron trifluoride etherate was maintained at room temperature for about eighteen hours, diluted with 100 milliliters of methylene chloride and thirty milliliters of water and the organic phase separated. The aqueous phase was washed with 100 milliliters of methylene chloride which was combined with the organic phase and the whole washed with water and then dried. The solvent was distilled from the dried solution leaving a residue containing 17α, 20β-dihydroxy - 21 - acetoxy - 4 - pregnene - 3,11 - dione. The crude mixture was dissolved in a mixture of six milliliters of acetic anhydride plus six milliliters of pyridine and the solution maintained at room temperature for about eighteen hours. The solution was poured into ice water and the mixture extracted with methylene chloride. The methylene chloride layer was washed with dilute hydrochloric acid, water and then dried. The dried solution was evaporated to dryness leaving a residue which after crystallization from a mixture of acetone and ether, melted at 240 to 245 degrees centigrade, and after a second crystallization from the same mixture, melted at 247 to 249 degrees centigrade, had an $[\alpha]_D$ of plus 165 degrees in acetone, an $E_{238.5}$ of 14,075 in ethanol and the analysis below.

Calculated for $C_{25}H_{34}O_7$: C, 67.24; H, 7.67. Found: C, 67.26; H, 7.85.

*17α,20β,21-trihydroxy-4-pregnene-3,11-dione*

A solution of 150 milligrams of potassium carbonate and 250 milligrams of potassium bicarbonate in five milliliters of water was added to a solution of 260 milligrams of 17α-hydroxy-20β,21-diacetoxy-4-pregnene-3,11-dione in twenty milliliters of methanol. The solution was maintained in an atmosphere of nitrogen for three days at room temperature and then neutralized with 0.3 milliliter of acetic acid. The solution was concentrated to between five to ten milliliters by distillation at reduced pressure and then mixed with 100 milliliters of water. The aqueous mixture was extracted with four fifty-milliliter portions of chloroform which were combined, washed with aqueous potassium carbonate, water and then dried. The dried solution was evaporated to dryness and the residue crystallized from a mixture of acetone and Skellysolve B to give crystals of 17α,20β,21-trihydroxy-4-pregnene-3,11-dione (Reichstein's Substance U) melting at 201 to 203 degrees centigrade and, after a second crystallization from the same solvent, melting at 202 to 204 degrees centigrade and having an $[\alpha]_D$ of plus 154 degrees in acetone.

It is to be understood that the invention is not to be limited to the exact details of operation or exact compounds shown and described, as obvious modifications and equivalents will be apparent to those skilled in the art, and the invention is therefore to be limited only by the scope of the appended claims.

We claim:
1. An 11-oxygenated-17α,20α-epoxy-21-oxy-4-pregnen-3-one represented by the following formula:

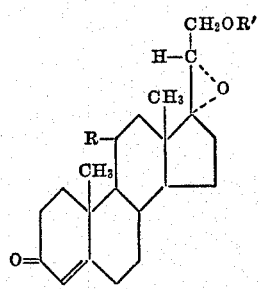

wherein R is selected from the group consisting of hydroxy and keto and R' is selected from the group consisting of hydrogen and the acyl radical of a hydrocarbon carboxylic acid containing from one to twelve carbon atoms, inclusive.

2. 11β-hydroxy-17α,20α-epoxy - 21 - acetoxy-4-pregnen-3-one.
3. 17α,20α-epoxy-21-acetoxy-4-pregnene-3,11-dione.
4. 11β,21-dihydroxy-17α,20α-epoxy-4-pregnen-3-one.
5. 17α,20α-epoxy-21-hydroxy-4-pregnene-3,11-dione.

References Cited in the file of this patent
UNITED STATES PATENTS

| | | |
|---|---|---|
| 2,265,143 | Butenandt | Dec. 9, 1941 |
| 2,769,824 | Schneider | Nov. 6, 1956 |